P. G. BEREMAND.
DIFFERENTIAL AND DRIVING MECHANISM.
APPLICATION FILED JULY 7, 1917.
1,342,938.
Patented June 8, 1920.
2 SHEETS—SHEET 1.
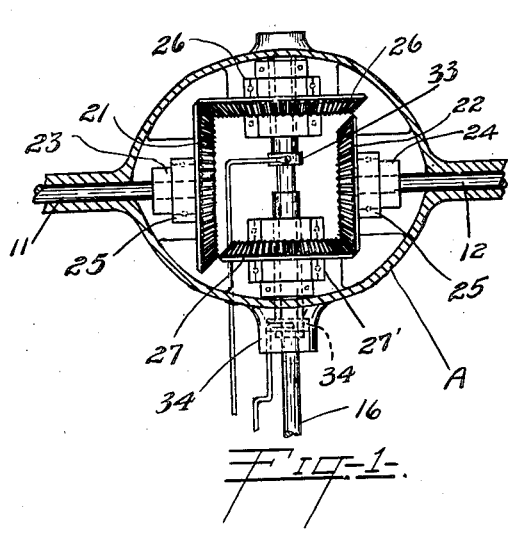
Fig-1-
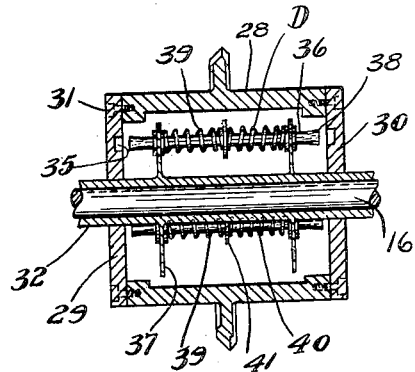
Fig-2-
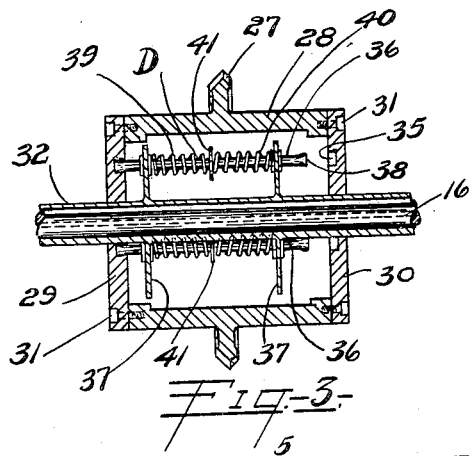
Fig-3-
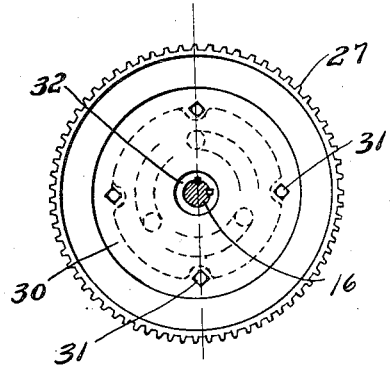
Fig-4-
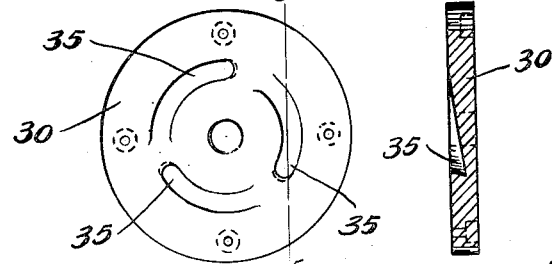
Fig-5-  Fig-6-
Inventor
Preston G. Beremand
Edward R. Monroe
Attorney

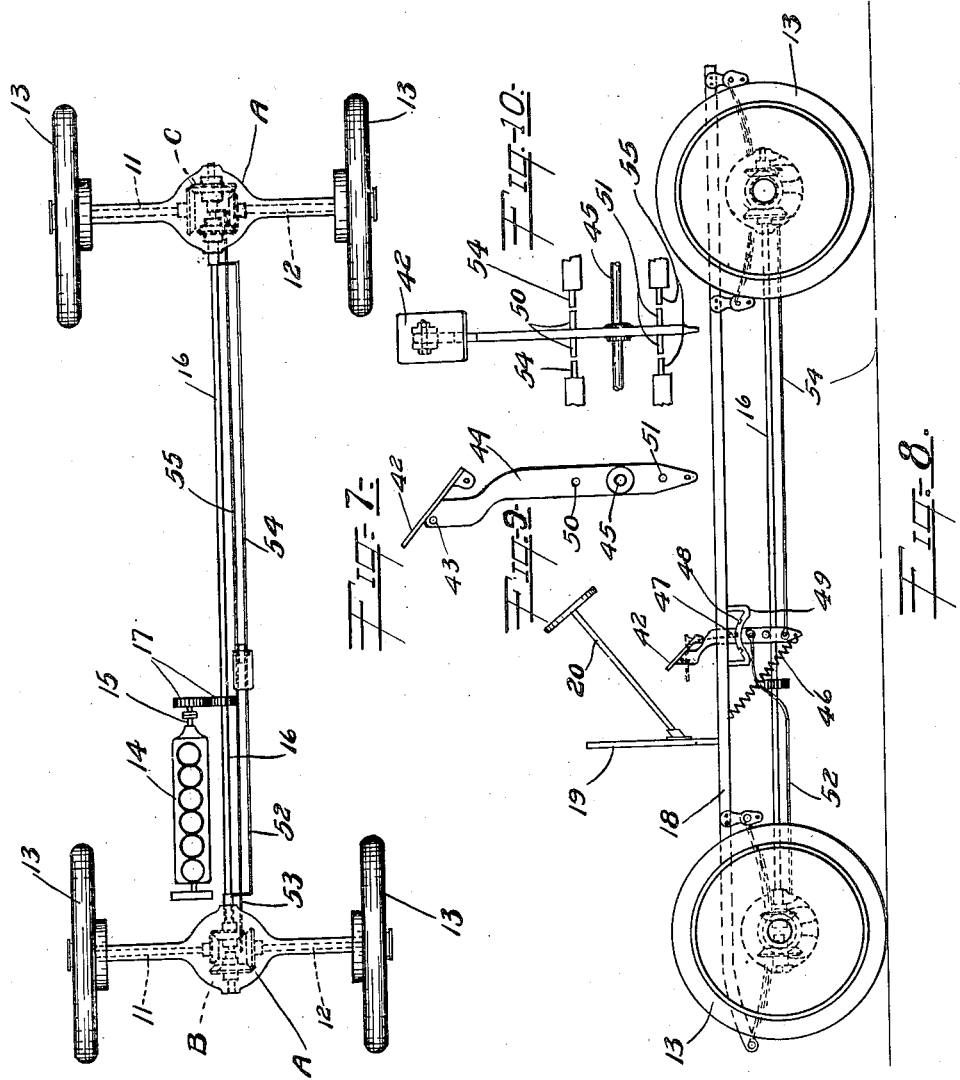

UNITED STATES PATENT OFFICE.

PRESTON G. BEREMAND, OF BAY CITY, MICHIGAN.

DIFFERENTIAL AND DRIVING MECHANISM.

1,342,938.  Specification of Letters Patent.  Patented June 8, 1920.

Application filed July 7, 1917. Serial No. 179,278.

*To all whom it may concern:*

Be it known that I, PRESTON G. BEREMAND, a citizen of the United States of America, residing at Bay City, in the county of Bay and State of Michigan, have invented certain new and useful Improvements in Differentials and Driving Mechanisms, of which the following is a specification.

This invention relates to a driving mechanism for self-propelled vehicles, and is designed not only for the performance of the driving functions of the vehicle, but also for the performance of the differential functions thereof.

Another object resides in the provision of a mechanism constructed whereby all of the wheels perform the functions of driving wheels and whereby one wheel may be propelled independently of the other wheels, so that in the event that one, two or three wheels of the car should become disabled, the car may be driven by the remaining wheel.

It is still further designed to provide a device of the nature stated, embodying among other characteristics, a positive drive for each wheel and constructed whereby one wheel may rotate at greater speed than the opposite wheel when turning a corner.

Having the above and other objects in view, the invention consists, generally, in the combination and arrangement of parts hereinafter more fully described, illustrated in the accompanying drawings, and pointed out more particularly in the appended claims.

In the drawings:

Figure 1 is a horizontal transverse sectional view of one of the differential mechanisms.

Fig. 2 is a sectional view of one of the gears of the mechanisms illustrating the clutching mechanism of the differential mechanisms in neutral position.

Fig. 3 is a view similar to Fig. 2, illustrating the clutching mechanism of the mechanisms in operative position for driving ahead.

Fig. 4 is an end view of the driving gear of the mechanisms.

Fig. 5 is a face view of the inner side of one of the end plates of the driving gear.

Fig. 6 is a sectional view on the line 5—5 of Fig. 5.

Fig. 7 is a plan view of a motor vehicle chassis showing the mechanisms in dotted lines and arranged for a four wheel drive.

Fig. 8 is a side elevation of the vehicle.

Fig. 9 is an enlarged detail view of the foot lever for controlling the mechanisms.

Fig. 10 is a front elevation of the said foot controlling lever and adjunctive parts.

Referring now more particularly to the accompanying drawings, the reference character A indicates the front and rear mechanism casings including the front and rear axle casings in which are mounted the parts 11 and 12 of the front and rear axles which carry the ground wheels 13.

The character 14 indicates an engine of any suitable character whose drive shaft 15 has operative driving connection with the main drive shaft 16 of the machine through the instrumentality of the gear connection 17. The chassis frame is indicated at 18, being mounted on the machine in any suitable manner and on which is mounted the usual dash 19, together with the usual steering post 20.

There are two mechanisms B and C, the former being located in the front casing A and the latter being located in the rear casing A, and both being operatively connected together by the aforesaid main drive shaft 16. Both mechanisms are the same in construction and it will be necessary, therefore, to describe in detail but one of them. To this end, there is fixedly secured on the inner ends of the axle sections 11 and 12, the bevel gears 21 and 22, each of these gears having bearing sleeves 23 and 24 by means of which and suitable fastenings 25, the fixed connection between said gears 21 and 22, with the respective shaft sections is effected.

Beveled gears 26 and 27 are mounted on suitable bearings in the casing and mesh with the gears 21 and 22 which are secured to the wheel shafts 11 and 12 respectively, said wheel shafts being rotated through instrumentality of the gears 21 and 22, and clutching mechanism carried on a sleeve within the gears 26 and 27 as will be presently described. These gears 26 and 27 are of peculiar construction, each having a hollow hub 28 rotating in the bearings 26' and 27'; and being provided with removable end plates 29 and 30, the removable connection between said end plates and hub being effected by the bolts or screws 31, whose heads are countersunk in the outer faces of the end plates. The beveled teeth of the gears 26 and 27 are formed with the hubs exteriorly thereof and intermediate the ends of the same, as shown particularly in Figs. 2 and 3. The hub is mounted on the bearing and has extending through same the sleeve 32, which is slidably keyed to the main drive shaft 16 in such manner that the said sleeve may slide thereon, and by means of clutching mechanism cause the gears to rotate in either direction, or said clutching mechanism may rotate independently of said gears. Each sleeve 32 of the respective hub of the respective gears 26 and 27 has a collar 33 and 34 respectively for a purpose to be presently explained, and the inner face of each end plate 30 has a plurality of arcuate shaped grooves 35, whose bottoms taper out to the surface of the inner side of the end plates, as shown particularly in Fig. 6.

A clutching mechanism D is mounted in each hub 28 and consists in a plurality of pins 36 slidably mounted in the flanges 37 on each sleeve 32 of each hub 28. The opposite ends of these pins 36 are enlarged or headed as indicated at 38 and are adapted to lie in or opposite to the plane of the aforesaid tapering grooves 35 in the inner faces of the end plates 29 and 30. Springs 39 and 40 are mounted on these pins 36, with their outer ends bearing against the flanges 37 and their inner ends bearing against a dividing flange 41, all for a purpose presently explained.

The sleeve 32 of the clutching mechanisms may be moved on the main drive shaft in any suitable manner. One way in which this result is accomplished resides in the provision of a foot lever 42 pivoted at 43 on a lever 44 pivoted at 45 on the chassis frame and this lever 44 is held normally in a substantially vertical position by means of a spring 46 connected to the lower end thereof and to the chassis frame. The foot lever 42 is held normally in a downwardly inclined position, as shown in full lines in Figs. 7 and 8, by means of a spring actuated pawl 47, engaging in the central one of the notches 48, in the segment 49, secured to the chassis adjacent one side of the lever 44. This lever 44 has upper and lower pins 50 and 51, respectively. A connecting rod 52 connects with one of the upper pins 50 of the lever 44, and with the aforesaid collar 34 on the sleeve 32, of the hub 28, of the gear 27. A rod 53 is connected with the other upper pin 50 and with the collar 33 on the sleeve 32 of the hub 28, of the gear 26. Connecting rods 54$^a$ connect with the lower pins 51 of the lever 44, and with the respective collars on the sleeves 32 of the hubs 28, of the gears 26 and 27, in the other mechanism, all of the collars 34 being so arranged as to operate in the oil in the mechanism casings, the collars 33 also, of course, operating in the oil in the mechanism casings.

As shown in Fig. 2, the pins 36 of the clutch mechanisms D are in neutral positions. As shown in Fig. 3, the pins 36 of the clutch mechanisms D have one of their headed ends at one side of the hubs 28 of the gears 26 and 27, lying in the grooves 35 of the end plates 29 of the hubs of the respective gears 26 and 27. When the clutch mechanisms are in this latter position, the mechanism is set to go ahead, and when it is desired to reverse, the pins 36 are shifted so that the headed opposite ends of the pins are thrown into grooves 35 of the end plates 30 of the hubs 28 of the respective gears 26 and 27. The cam grooves 35 in the opposite walls 29 and 30 of the hollow gear 28 are reversely arranged so that the drive may act differentially on forward and reverse. The springs 39 and 40 on the pins 36 of the clutch mechanisms D tend to hold said pins 36 into engagement with the grooves 35 in the respective end plates 29, preventing the pins from backing out of the respective grooves in said end plates 29 when the mechanism is in operative go-ahead position.

It is necessary when turning or rounding a corner for one wheel at the front and rear to rotate faster than the other wheel at the front and rear, and in the present instance, upon turning a corner or a curve the pins 36 will override the grooves 35 in the end plates 29 of the hubs 28 of the respective gears 26 and 27, because the wheel shaft sections 11 and 12 will rotate faster than the main driving shaft 16. When this overriding of the pins 38 with relation to the grooves 35 in said end plates 29 happens, the springs 40 will be compressed and thereby have a continuous tendency to force said pins 36 back into the grooves 35 of the end plates 29 until the wheels are again running in a straight or substantially straight line or at the same speed as the driving shaft 16. Thus, the pins 36 click into and out of the grooves 35 of the end plates 29 of the hubs 28 of the respective gears 26 and 27 of the gear mechanisms according to the direction of movement of the vehicle.

The mechanism is shifted into the different positions by means of the aforesaid levers 42 and 44 and the connections between the respective levers and the mechanisms.

When it is desired to reverse the car, the engine is of course first reversed and the operator tilts the foot lever 42 forwardly to the dotted line position shown in Fig. 8. This causes the pawl 47 to be lifted out of the central one of the notches 48 of the segment 49, the spring of the pawl 47 having a normal tendency to force said foot lever 42 back to its normal downwardly inclined position, shown in Fig. 7. As the foot lever 42 is shifted on its pivot 43 to the dotted line position shown in Fig. 8, the lever 44 is thrown forwardly on its pivot 45, which causes sliding movement of the sleeves 32 of the hubs 28 of the respective gears 26 and 27, and causes the pins 36 of the clutch mechanisms D to engage in the grooves 35 of the end plates 30 of the hubs 28 of the gears 26 and 27, when reverse movement of the vehicle may be readily effected. Upon release of pressure on the foot lever 42, the spring actuated pawl 47 moves to neutral position while the spring 46 returns the lever 44 to its neutral position.

Supported on the chassis, in alinement with the aforesaid upper and lower pins 50 and 51 of the lever 44, are upper and lower sets of pins 54 and 55, respectively, which are stationary and which are provided so that in the event that any one wheel should become disabled the operator can shift the lever 44 into neutral position and slip the corresponding connecting rod 52—53 on to the respective pin 54—55, and this one wheel will remain in neutral position while the vehicle will continue to run on the other wheels. It will, therefore, be understood that any one, two or three wheels of the vehicle may be disabled and the vehicle will still operate.

What I claim is:—

1. The combination of a chassis, front and rear axle sections, wheels on the front and rear axle sections, a front and a rear gear mechanism connecting the front and rear axle sections together, an operative connection between the gear mechanisms whereby all of the wheels are driven by the gear mechanisms, and a pair of clutches located within and operatively connected to each gear mechanism.

2. The combination of a chassis, front and rear axle sections, wheels on the front and rear axle sections, a front and a rear gear mechanism connecting the front and rear axle sections together, an operative connection between the gear mechanisms whereby all of the wheels are driven by the gear mechanisms, and a pair of clutches operatively connected to each gear mechanism, two of the gears of each gear mechanism having hollow hubs, the said clutch mechanisms of each gear mechanism being confined within said hollow hubs of said mechanisms and co-acting with the same.

3. The combination of axle sections, a driving shaft, a gear mechanism connecting the axle sections and the drive shaft, said mechanism including a gear provided with a hollow hub having arcuate shaped grooves in its ends, and a clutch mechanism within said hollow hub provided with means to coact interchangeably with the grooves in the opposite ends of said hub to drive ahead or to reverse.

4. The combination of a chassis, front and rear axle sections, wheels on the outer ends of the axle sections, a front and a rear gear mechanism connected to the front and rear axle sections, a driving connection between said mechanisms, a casing for each mechanism, a pair of clutch mechanisms located within and co-acting with each gear mechanism, and a device operatively connected with said clutch mechanisms to operate the same simultaneously.

5. The combination of a chassis, front and rear axle sections, wheels on the outer ends of the axle sections, a front and a rear gear mechanism connected to the front and rear axle sections, a driving connection between said gear mechanisms, the latter constructed and arranged whereby all of the wheels are driven, clutch mechanisms operatively connected with the gear mechanisms whereby upon rounding a corner or curve, the clutch mechanisms are automatically operated to permit the wheels on one side of the chassis to revolve faster than the wheels on the opposite side thereof, a foot lever, and connections between the foot lever and the clutch mechanisms to actuate the latter, and devices on the chassis whereby some of said connections between said foot lever and the clutch mechanisms may be supported and the vehicle driven over one wheel by one of the connections only between the foot lever and one of the clutch mechanisms.

6. The combination of a chassis, front and rear axle sections, wheels on the outer ends of the axle sections, a front and a rear gear mechanism connected to the front and rear axle sections, and operative driving connection between said gear mechanisms, clutch mechanisms contained within and operatively connected to said gear mechanisms, a lever pivoted on a chassis, operative connections between said lever and the clutch mechanisms, and a second lever pivoted on the aforesaid lever for operation to release and permit pivotal movement of the first mentioned lever.

7. The combination of a chassis, front and rear axle sections, wheels on the outer ends of the axle sections, a front and a rear gear mechanism operatively connecting the inner ends of the axle sections, an operative driving connection between said gear mechanisms, said operative connection between the gear mechanisms and the latter being such that all of the wheels are driving wheels, a casing for each gear mechanism, a pair of clutches contained within and operatively connected with each gear mechanism, a spring controlled lever pivoted on the chassis, and connections between the lever and said clutch mechanisms to operate the latter.

8. The combination of axle sections, a drive shaft, and a gear mechanism operatively connecting the axle sections and the drive shaft together, a pair of clutch mechanisms contained within and operatively connected to the gear mechanism, said clutch mechanisms being confined within gears of the gear mechanism and co-acting with such gears to effect the clutching operation, and means for operating the clutch mechanisms.

9. A clutch of the character described, comprising a cylindrical shaped member, end members detachably secured to the cylindrical member and provided with arcuate grooves on their inner faces, a sleeve slidable through the end members of the cylindrical shaped member and provided with flanges and spring controlled pins carried by the flanges for co-action with said grooves in the end members to effect a clutching action.

10. A clutch of the character described, comprising a cylindrical shaped member, end members for the aforesaid member having arcuate shaped grooves on their inner faces, the bottoms of the grooves tapering, a sleeve slidable through the end members and provided with flanges, and spring controlled pins carried by the flanges and having headed ends, the opposite ends of said pins adapted to engage interchangeably in the respective grooves of the end members for clutching purposes.

In testimony whereof I affix my signature.

PRESTON G. BEREMAND.